United States Patent [19]

Black et al.

[11] 4,186,889
[45] Feb. 5, 1980

[54] FORAGE HARVESTER RECUTTER SCREEN

[75] Inventors: Robert D. Black; John J. Hennen; Jerry L. Krafka, all of Ottumwa, Iowa

[73] Assignee: Deere & Company, Moline, Ill.

[21] Appl. No.: 907,126

[22] Filed: May 18, 1978

[51] Int. Cl.² .............................................. B02C 18/22
[52] U.S. Cl. .................................. 241/89.2; 241/89.3; 241/222
[58] Field of Search ...................... 56/13.6, 13.7, 13.9; 241/73, 74, 89.1, 89.2, 89.3, 89.4, 95, 101.7, 186.3, 222, 221, 273.4, 273.1, 273.2, 88, 88.1, 223

[56] References Cited

U.S. PATENT DOCUMENTS

| 3,525,375 | 8/1970 | Heising et al | 241/89.1 |
| 4,033,518 | 7/1977 | Fleming et al. | 241/222 X |

Primary Examiner—Mark Rosenbaum

[57] ABSTRACT

A forage harvester has a cutterhead housing with a rotary reel type cutterhead mounted therein, the cutterhead having a plurality of knives parallel to the cutterhead axis at the cutterhead periphery, the knife edges generating a cylinder as the cutterhead rotates. The cutterhead reduces crop material that is fed into the housing and discharges the reduced material through a discharge opening to a conveying system that conveys the crop material to a crop-receiving vehicle. Removably mounted over the discharge opening is a recutter screen that has an arcuate shape generally concentric with and adjacent to the cutterhead periphery and a plurality of elongated apertures, each aperture having parallel longitudinal edges that extend diagonally relative to the knife cutting edges. The apertures are arranged in two transversely extending rows with the apertures in one row being inclined in one direction from the vertical and the apertures in the adjacent row being inclined in the opposite direction, the opposite angle of inclination of the apertures in the second row counteracting the tendency of the apertures in the first row to move the crop material impelled through the apertures in the direction of inclination. Alternate screens are conventionally provided with different size apertures according to the fineness of cut desired, and the screens are removably mounted in a frame that is adjustable relative to the cutterhead to maintain the optimum minimum clearance between the cutterhead and the recutter screen.

7 Claims, 3 Drawing Figures

U.S. Patent      Feb. 5, 1980      4,186,889
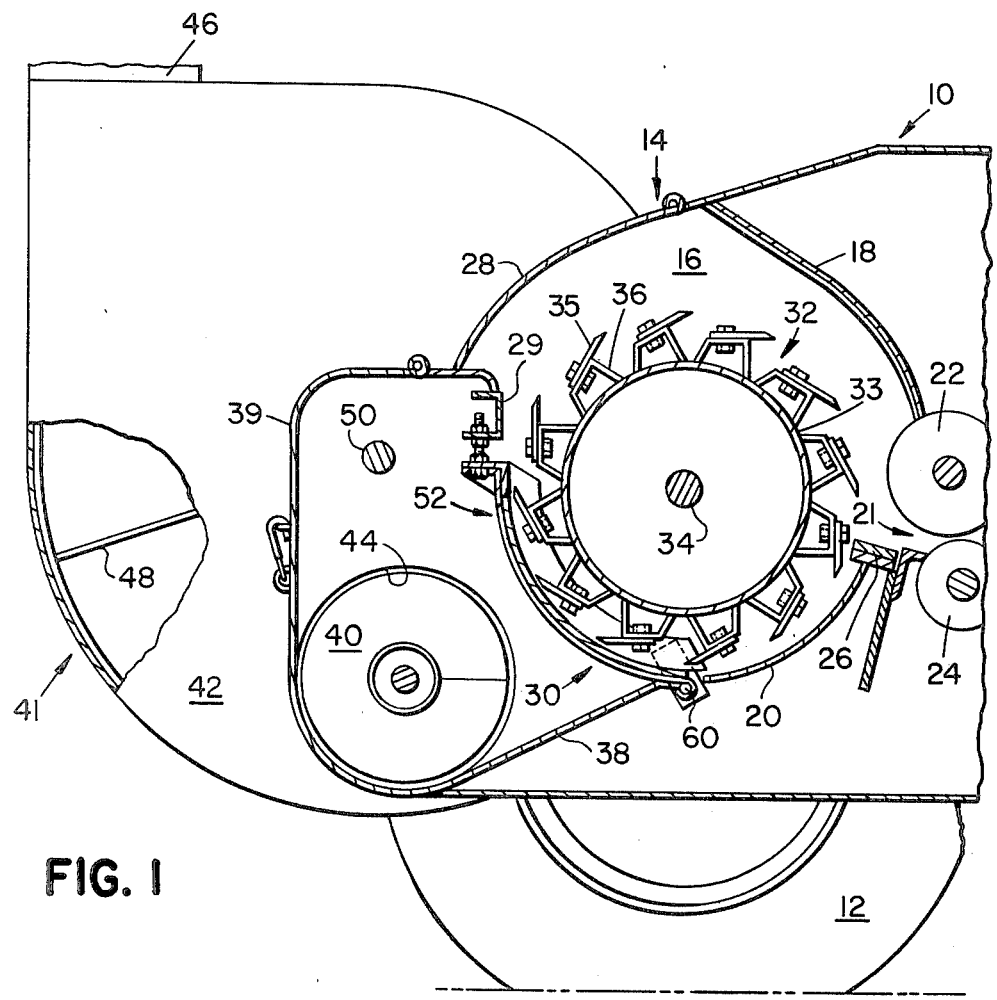
FIG. 1
FIG. 2
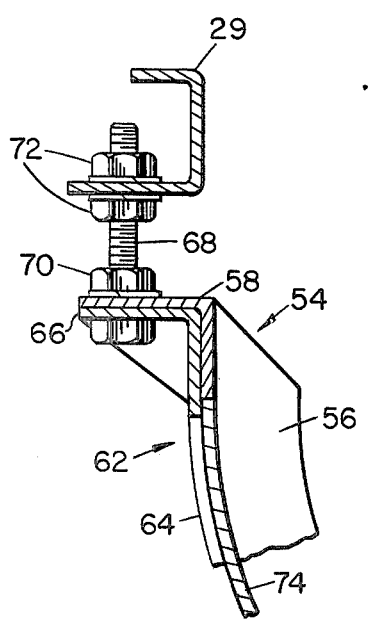
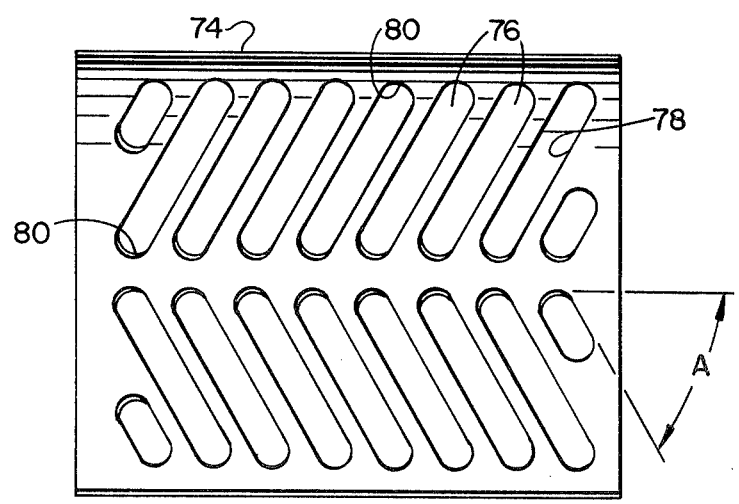
FIG. 3

FORAGE HARVESTER RECUTTER SCREEN

BACKGROUND OF THE INVENTION

This invention relates to a forage harvester and more particularly to an improved removable cutter screen mounted over the discharge opening of the cutterhead housing adjacent to the periphery of a reel type cutterhead to further reduce the crop before it is discharged.

Recutter screen for reel or cylinder type cutterheads are well known, such a recutter screen being shown in the U.S. Pat. No. 3,525,375 also assigned to the assignee herein. Earlier recutter screens generally had square or circular apertures in the screen, and the apertures in the recutter screen in said U.S. Pat. No. 3,525,375 represented an improvement over the earlier recutter screens in that the apertures were elongated and extended in a diagonal direction relative to the cutterhead axis, the cutterhead in said patent being provided with helical knives. One of the features of the recutter screen in said patent was the convenient means for adjusting the rearward end of the screen relative to the cutterhead periphery to obtain minimum clearance between the cutterhead knives and the screen at the rearward end of the apertures.

A later version of a similar recutter screen utilized in self-propelled forage harvesters manufactured by Deere & Co., the assignee of the present application, features a recutter screen having a greater circumferential dimension than the screen shown in said U.S. Pat. No. 3,525,375, with the diagonally elongated apertures being arranged in two transversely extending rows, all of the apertures extending at the same angle so that the opposite elongated sides of all the apertures were parallel.

Recently an improved cylinder type cutterhead was developed for use in such forage harvesters, the improved cutterhead featuring a large number of relatively short knives arranged in circumferential rows, each knife having a straight cutting edge parallel to the axis of the cutterhead. Such a cutterhead is disclosed in U.S. Pat. No. 4,061,284 also assigned to the assignee herein.

SUMMARY OF THE INVENTION

According to the present invention, there is provided an improved recutter screen of the type having elongated slots extending diagonally relative to the cutterhead axis. More specifically, the apertures in the improved recutter screen are provided in at least two transversely extending rows with the diagonally extending apertures in one row being canted relative to the cutterhead axis in the opposite direction from the apertures in the adjacent row. Such a recutter screen has particular utility when used in combination with a cutterhead having knives with straight cutting edges parallel to the cutterhead axis, such as shown in said U.S. Pat. No. 4,061,284. The diagonal apertures or slots in the screen tend to deflect the crop material moving through the screen in the direction of the slot so that the normally tangential discharge of the material is deflected in an axial direction relative to the cutterhead to a limited degree, and the provision of the second row of apertures that extend diagonally relative to the cutterhead knives in the opposite direction from the first row counteracts the deflection of the material moving through the first row of slots to thereby give a balanced pattern of crop material moving through the overall screen.

BRIEF DESCRIPTION OF THE DRAWINGS

FIG. 1 is a somewhat schematic vertical fore and aft section through the cutterhead portion of a forage harvester embodying the present invention.

FIG. 2 is an enlarged view of a portion of FIG. 1 showing the mounting of the recutter screen.

FIG. 3 is an enlarged plan view of the improved recutter screen.

DESCRIPTION OF THE PREFERRED EMBODIMENT

The invention is embodied in a pull-type forage harvester having a mobile main frame, indicated generally by the numeral 10, the frame being mounted on a pair of laterally spaced wheels 12 and beomg conventionally towed and powered by a tractor. Only a portion of the forage harvester is shown in the drawing, a harvester of the above general type being described in greater detail in U.S. Pat. No. 3,377,785, also assigned to the assignee herein.

A cutterhead housing 14 is mounted on the right side of the frame 10 and includes a pair of vertical, fore and aft side walls 16, only the inside wall being illustrated in FIG. 1 since the figure is a section view taken through the cutterhead housing. Extending between the side walls is an arcuate front wall 18 and a cutterhead band 20 that is spaced below the front wall 18 to form a forward crop inlet opening 21. Upper and lower feedrolls 22 and 24 respectively are disposed in front of the inlet opening 21 and operate to feed crop material rearwardly through the inlet opening and over a transverse extending shear bar 26 mounted on top of the housing band 20 and defining the lower side of the inlet opening 21.

Also extending between the opposite side walls rearwardly of the front wall 18 is a top door 28 that is swingable upwardly about its forward edge to provide access to the interior of the cutterhead housing. A transverse support member 29 extends between the opposite side walls below the door 28 and defines the top edge of a cutterhead discharge opening 30, the lower edge of the opening being defined by the rearward end of the band 20. The discharge opening 30 also spans the width of the cutterhead housing between the opposite side walls.

Mounted in the cutterhead housing 14 is an axially transverse rotary cylinder type cutterhead 32. The cutterhead is described in greater detail in U.S. Pat. No. 4,061,284, also assigned to the assignee herein, the cutterhead generally including a hollow drum 33 mounted on a transverse shaft 34 and having a plurality of relatively short straight knives 35 mounted on the drum periphery by angle type supports 36. The knives are mounted in circumferential rows, only a single row having twelve knives being shown in the drawings, the adjacent rows on the cutterhead being staggered from the illustrated row of knives. The axial length of each knife is substantially less than the axial length of the cutterhead. Each knife has a cutting edge parallel to the axis of the cutterhead at the cutterhead periphery so that the cutterhead knife cutting edges generate a cylinder as the cutterhead rotates, with each knife cutting edge registering with the shear bar 26.

Mounted on the frame rearwardly of the cutterhead housing is a transversely extending auger housing 38 that communicates with the cutterhead housing 14 through the discharge opening 30. The auger housing has a vertically swingable door 39 along its upper and rearward sides to provide access to the cutterhead through the discharge opening. A transverse auger-type conveyor 40 is mounted in the bottom of the housing 38 and operates to move crop material from the discharge opening 30 laterally on the harvester to a blower type elevator 41 at the left side of the machine. The blower type elevator includes a generally upright housing 42 having an inlet 44 coaxial with the auger 40 to receive material from the auger 40. The housing 42 also includes a tangential outlet 46 and a fan-type rotor 48 is mounted in the housing for engaging crop material moving through the inlet 44 and blowing it tangentially out the outlet 46 through a discharge spout (not shown) and into a trailing vehicle. The fan-type impeller is driven through a transverse shaft 50 that is connected to and driven from the cutterhead by belt-type drive (not shown) at the right side of the machine.

Removably mounted in the discharge opening 30 is an arcuate recutter screen assembly, indicated in its entirety by the numeral 52. The recutter screen assembly includes a generally U-shaped frame 54, the opposite legs of which are formed by a pair of arcuate or crescent shaped side members 56 having their upper ends connected by a transverse member 58. The side members 56 are disposed adjacent the opposite side walls 16 of the housing outwardly of the cutterhead 32, the lower forward ends of the side members 56 being pivotally connected to the side walls by a pair of transverse pivots 60 respectively removably fastened to the opposite side walls. Also pivotally mounted on the pivot 60 is a bail or clamp 62 that includes a pair of arcuate side members 64 having the same radius of curvature as the rearward side of cresents or side members 56. The members 64 are disposed closely adjacent to the side members 56 and are connected by a transverse member 66 extending between the upper ends of the member 64 adjacent to and below the transverse member 58. A pair of vertical bolts 68 extend upwardly through openings in the transverse member 66 and the transverse member 58 adjacent the opposite ends thereof and are secured therein by lower clamp nuts 70, which operates to hold the clamp against the frame 54. By tightening the nuts 70, the clamp 62 can be drawn against the frame 54. The entire frame 54 can be adjusted about the axis of the pivots 60 by adjusting a pair of adjusting nuts 72 on each bolt 68, the bolts 68 extending upwardly through openings in the support member 29 with the adjusting nuts being in engagement with the opposite sides of the support member, so that adjustment of the nuts 72 along the bolts causes the rearward end of the recutter screen assembly 52 to shift vertically about the axis of the pivot 60.

Removably mounted in screen assembly 52 is an arcuate recutter screen 74, the screen being removably clamped in the screen assembly between the side members 64 of the bail or clamp 62 and the side members 56 of the frame. To mount the screen assembly, the screen assembly, the clamp 62 is separated from the frame 54 by loosening the nuts 70 and the screen 74 is then inserted between the clamp and the frame, after which the nuts 70 are again tightened to draw the clamp 62 and the screen 74 against the side members 56 of the frame 54.

The screen has a plurality of apertures 76 having parallel longitudinal edges 78 and semicircular opposite ends 80. The screen 74 is a section of a cylinder having approximately the same axis and radius of curvature as the cutterhead periphery, the discharge opening and the screen extending approximately 90° relative to the cutterhead. The longitudinal edges 78 of the apertures 76 extend diagonally relative to the axis of the cutterhead and consequently diagonally relative to the cutting edges of the knives 35. In the illustrated embodiment, the apertures extend at approximately a 30° angle from the vertical or at a 60° from the axis of the cutterhead and the edges of the knives, the 60° angle being indicated by the letter "A" in FIG. 3. The apertures are arranged in two transversely extending rows with the apertures in each row having substantially the same length and extendinhg for a distance of approximately 20° relative to the cutterhead axis. The apertures in one row are canted 30° from the vertical in one direction and the apertures in the next row are canted 30° from the vertical in the opposite direction so that the included angle formed by the adjacent apertures in the adjacent rows is approximately 120°. As is apparent, the end apertures in each row are substantially shortened.

Although only a single screen is shown in the drawings, it is conventional to provide alternate screens with different size slots. For example, it is contemplated that screens having slots varying in widths from ⅜-inch to 2¾-inch will be provided, the alternate screen sizes being provided to accommodate the desires of the user for various sizes of cut in the processed crop material.

As is apparent, if the screen has narrower slots, a greater number of slots are provided and in the screens with narrower slots, the last two or three slots in each row will be necessarily foreshortened to cover the entire screen area with slots. As is also apparent, the screen is made from a single piece of material with the slots or apertures cut or punched out of the screen. The clamp type mounting of the screen in the screen assembly eliminates the need for extra fitting or mounting attachments for the screen. As is also apparent, the individual screens are relatively inexpensive and easily replaced when they are worn out without replacing the remaining parts of the screen assembly.

In operation, the machine operator in some crops and crop conditions does not need or desire a recutter screen at all, in which case the entire assembly 52 is easily removed by removing the pivots 60 and unscrewing the nuts 72 from the bolts 68, whereupon the entire assembly can be withdrawn from the auger housing door 39.

When the screen assembly is being used, the desired screen 74 is mounted in the screen assembly 52 as previously described, and the entire assembly 52 is vertically adjusted about the pivots 60 so that there is a minimum clearance between the cutterhead knives and the upper rearward end of the screen. As is well known, the crop being fed into the cutterhead is reduced initially as it is engaged by the cutterhead at the shear bar 26, and the crop is further reduced as it is forced through the apertures 76 of the recutter screen 74. Since the knife cutting edges are parallel to the cutterhead axis, the interaction between the knife cutting edge and the diagonal edges 78 of the screen apertures gives the crop material an axial component to its discharge velocity as well as the tangential component imparted by the cutterhead, which tends to shift the crop material in an axial direction as it is being discharged. Thus, while the crop material moving through the lower row of apertures is shifted in one direction, the crop material is shifted in the opposite direction as it moves through the upper set of apertures, to thereby balance the overall flow pattern of material through the screen, to improve the flow of crop material to the discharge auger 40.

We claim:

1. In a forage harvester comprising (a) a mobile frame, (b) a cutterhead housing mounted on the frame and having a crop inlet opening and a discharge opening, (c) a rotary cutterhead mounted in the housing and having a plurality of knives with cutting edges at the cutterhead periphery, the knife cutting edges generating a cylinder as the cutterhead rotates, said cutterhead engaging and reducing crop material that moves through the housing inlet opening and impelling said material through the discharge opening, (d) an arcuate recutter screen in the form of a section of a cylinder, the screen including a plurality of elongated apertures, each aperture having a longitudinal edge extending diagonally relative to the cutting edges of the cutterhead knives and the cutterhead axis; and (e) means removably mounting the recutter screen over the discharge opening adjacent the cutterhead periphery and generally coaxial with the cutterhead, the improvement comprising the apertures arranged in at least two transversely extending rows, said aperture edges in one row being substantially mutually parallel and canted relative to the knife cutting edges to form an angle of less than 90° measured from the knife edge to the aperture edge in a first clock direction, said aperture edges in a second row adjacent said one row canted relative to the knife edges to form an angle of less than 90° measured from the knife edge to the aperture edge in a second clock direction opposite from the first direction.

2. The invention defined in claim 1 wherein the longitudinal edges of the apertures of said rows being canted between 20° and 40° from the vertical.

3. The invention defined in claim 2 wherein only two rows of apertures are provided in the screen, each aperture extending approximately 20° relative to the cutterhead axis.

4. The invention defined in claim 1 wherein said mounting means includes a frame and means removably clamping the screen to the frame.

5. The invention defined in claim 4 wherein the mounting means includes adjusting means operative between the forage harvester frame and the mounting means frame for selectively adjusting the position of the mounting means frame relative to the cutterhead and thereby varying the clearance between the cutterhead and the screen.

6. The harvester of claim 1 wherein said knife edges are parallel to the axis of rotation of the cutterhead.

7. The harvester of claim 6 wherein the axial length of said knife is substantially less than the axial length of the cutterhead.

* * * * *